E. R. AMES.
NUT AND BOLT LOCK.
APPLICATION FILED MAY 13, 1913.
1,097,205.
Patented May 19, 1914.
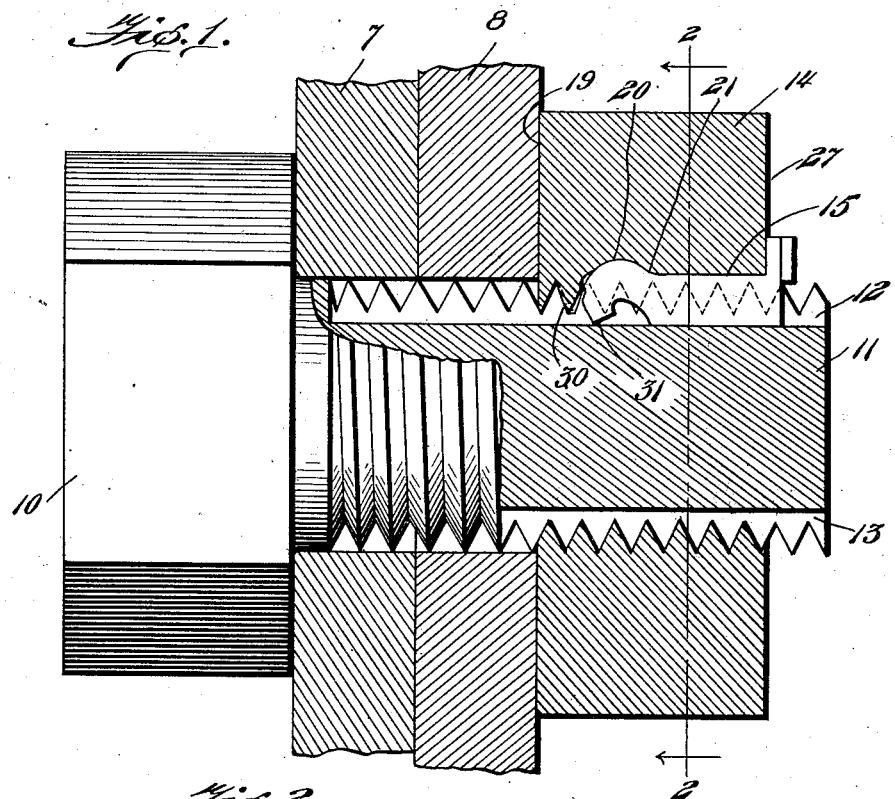
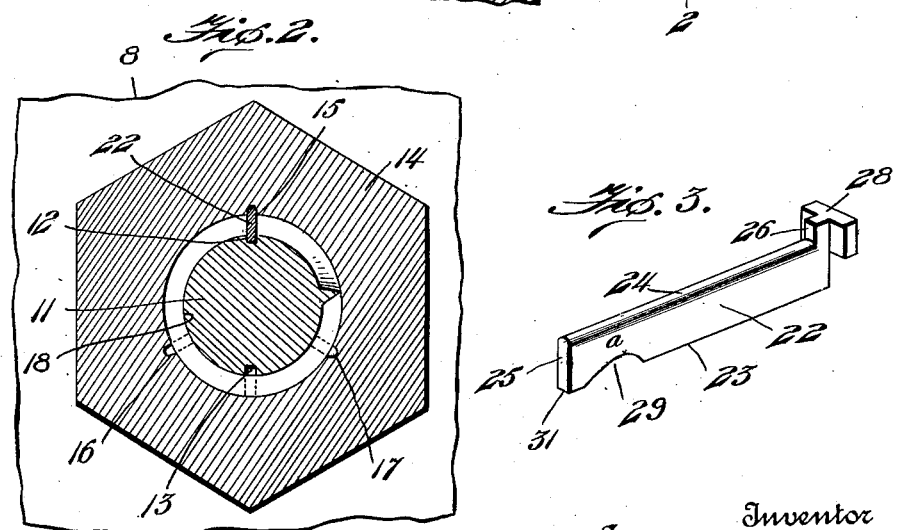

UNITED STATES PATENT OFFICE.

ERNEST R. AMES, OF SABINAL, TEXAS, ASSIGNOR OF ONE-HALF TO COMMODORE P. WOOD, OF SABINAL, TEXAS.

NUT AND BOLT LOCK.

1,097,205.  Specification of Letters Patent.  Patented May 19, 1914.

Application filed May 13, 1913. Serial No. 767,333.

*To all whom it may concern:*

Be it known that I, ERNEST R. AMES, a citizen of the United States, residing at Sabinal, Uvalde county, State of Texas, have invented certain new and useful Improvements in Nut and Bolt Locks, of which the following is a specification.

My invention relates to nut and bolt locks and more particularly to that class of such locks which employs a key that fits in alined grooves or seats in the bolt and nut.

The object of the invention is to generally improve such locking means and to render their locking action positive and dependable, while at the same time providing a device which is inexpensive and which is readily applied and may if desired form a permanent lock between the bolt and the nut.

The above and other objects and novel features will be apparent from the following description taken in connection with the accompanying drawing, in which:

Figure 1 is an enlarged longitudinal sectional view showing the bolt and nut locked together. Fig. 2 is a cross sectional view on a reduced scale taken along line 2—2 of Fig. 1. Fig. 3 is a perspective view of the locking key.

Referring to the drawing Fig. 1 shows a bolt which is provided with the usual head 10 and the threaded shank 11, the threads of which are mutilated by two narrow grooves or seats 12 and 13 extending transversely across the threads of the bolt.

As shown in Fig. 2 the seats 12 and 13 extend into the bolt a slightly greater depth than the threads and are formed on diametrically opposite sides of the bolt, extending in the present instance nearly the entire length of the shank. The nut 14 which may be of any suitable form fits on the shank of the bolt and clamps the work or plates 7 and 8 together, having rounded grooves or seats 15, 16 and 17 which extend transversely of the threads in the central opening 18 of the nut. The seats in the nut are spaced apart substantially 120° and as in the bolt, they are of slightly greater depth than the threads. The seats in the nut, however, do not extend all the way therethrough and consequently leave several complete threads adjacent one face, which is the face 19 that bears against the work. The complete threads extend across the keyway formed by the coöperating grooves in the nut and bolt and block the said keyway forming a part against which the key is driven and an anvil to upset the inner end of the key. The fact that the nut carries the part upon which the key depends for upsetting or bending the end into locking position, insures it being possible to use the same length key for all locking positions. Furthermore, the locking effort will be effected by the same part of the key at all positions and that part of the key is shaped so as to render absolute the bending of the key at a predetermined section thereof. It will be understood that the arrangement of the seats in the bolt and nut may be reversed, that is, the three seats may be formed in the bolt and two seats in the nut, the number of locking positions in either instance will be six or one more than the total number of seats in the coöperating threaded portions. At the inner end of each of the seats in the nut and therefore in each locking position adjacent the complete threads there is a cavity 20 which has a concave bottom and parallel side walls which merge into the walls of the seat. The bottom wall of the cavity is joined to the bottom wall of the seat by a rounded shoulder 21 which performs a function hereinafter set forth. It is not necessary to bore or machine the key seats and cavities as the requisite recesses may be formed on the nuts and bolts at the same time the latter are made by simply pressing them in while the work is hot, by means of a suitable punch or tool. The threads may be pressed or cut afterward and such a construction makes it inexpensive and simple to apply the proper locking recesses to the parts.

Fig. 3 illustrates a perspective view of the key 22, which I use to lock the bolt and nut together. The key comprises a narrow elongated plate formed to fit the alined recesses in the bolt and nut, the edge 23 which bears in the bottom of the seat in the bolt is flat while the edge 24 which bears against the bottom of the seat in the nut is rounded. The end 25 which extends into the nut is flat, while the opposite end has a head formed thereon by means of which the key may be driven into the alined seats. The head comprises a T-shaped offset part forming a shoulder 26 to engage the outer face 27 of the nut and limit the extent to which the key may be driven into the seats. At the outer end of the key the cross part 28 of the head extends beyond the side faces of the key and as the shoulder 26 is the limit of the inward movement of the key there will be a space between the cross part 28 and the face 27 of the nut into which a claw bar or other suitable tool may be inserted to withdraw the key from the locking position. At its lower edge 23 and near the end 25 the key 22 has a hollowed out or cut away portion 29 which is for the purpose of weakening the key slightly at the section *a*. The recess 29 is of greatest depth adjacent its end farthest removed from the end face 25, thus making the end of the key weakest at the section *a*. The recess 29 is so placed and shaped as to control the point at the weakened section of key where bending or buckling commences and from which it progresses in order to insure and maintain complete contact of that portion of the key adjacent to rounded shoulder 21 with said shoulder. This action is further assured by the tendency of end or face 25 of the key 22 to maintain its original position at right angles to the edge 23 by reason of being partly embedded in the thread 30 which crosses keyway 12 in the bolt and being assisted further by the flat portion of the edge 23 between the cutaway portion 29 and the end of key 25. The key 22 is of tough bendable metal and when driven into the registering keyways it assumes the shape shown in Fig. 1. The flat end 25 of the key has a tendency to remain at right angles to the flat edge 23, being wedged by the action of the deflecting thread 30 which extends across the keyway, until rounded shoulder 21 arrests bending of key at that point after which further progression of the key into the keyway forces same to follow the lines of cavity 20. The above described action tucks or curls the end 31 of the key backwardly and causes the inner upper edge 24 of the key to completely fill the cavity and on further upsetting the said end will raise the nut and take up all the slack between the threads, holding the bolt in close contact with the nut at the opposite side to where the key is in use. It will thus be seen that when the key is inserted into the keyway it is locked therein and bent upon itself to produce a thickened portion at the end of the key to wedge the parts together. The distance between the shoulder 26 and end face 25 is slightly greater than the distance between the first thread 30 which it encounters and the end face 27 of the nut, the additional length being sufficient to cause the intermediate section *a* to buckle and completely fill the cavity 20 by the time the shoulder 26 engages the end face 27 of the nut.

When the key is driven into the alined seats the end face 25 first engages the thread 30 on the nut which extends across the keyway and due to the driving of the key thereagainst the key as well as the nut will each receive a slight dent, and the part of the thread in the keyway will be bent slightly out of line with the rest of the thread and as a result the thread will afford an additional locking action, its position being so shown in Fig. 1. On continuing the driving of the key into the seat the same will bend at the weakened section *a* into the cavity 20, the edge 31 engaging the bottom of the seat 12 and the shoulder 26 engaging the end face 27 when the key is completely driven in, the shoulder 26 thereby providing a positive stopping point, so that the key cannot be ruptured by being driven in too far and to an extent where withdrawal as a whole and in its entirety would be uncertain or impossible. The key when driven in and upset into the position shown in Fig. 1 jams the nut and bolt threads together, acting in this respect in somewhat the same manner as a wedge by reason of forcing edge 31 of the key into close contact with the bottom of the groove in the bolt, thus also preventing endwise movement of the key as the engagement of the point 31 at one side and the cavity 20 and rounded shoulder 21 at the opposite side coöperate to hold the key against movement. The edge of the key which has been weakened is shaped differently from the shape of the edge which fits in the bottom of the seat in the nut and as a result it will not be possible to insert the key into the keyway in the wrong way, or in any but the proper way, thus insuring contact of the key head with the face of the nut regardless of the position of the nut on the bolt, also insuring the proper positioning of hollowed out section 29 in relation and presentation to cavity 20.

The locking of the nut to the bolt may be made permanent and the removal of the key may be rendered impossible by simply cutting off the head of the key. However, if it is desired to remove the key from the locking position to tighten up the nut or bolt, a claw hammer or other suitable tool may be applied to the head and the key may then be extracted. The end of the key is of suitable metal to withstand bending a number of times. When the key is drawn out, the rounded shoulder 21 which engages the part of the key which has entered the cavity will straighten out the bent part of the key and the latter will assume substantially the same shape that it had when driven into the keyway. When the key has been removed it is only necessary to give the nut a sixth of a turn to arrive at another locking position, whereupon the same key may be driven in and will assume its locking position in the cavity as before.

It will be seen that I have provided an inexpensive locking means and one which is reliable under all conditions and can be readily applied and, if desired, may be withdrawn or may be made permanent by the simple operation of cutting off the head which renders it inaccessible with ordinary manipulation. This locking means may also be used in many places where it is difficult or impossible to insert rivets, providing wherever used all the advantages of a cold rivet when the head of the key is removed or cut off besides making removal or tightening up easy when the head of the key is not removed. The key may also be used with positive results in places of great importance, such as on connecting rod bolts and nuts. As minor modifications are contemplated I do not wish to be limited to the exact details as shown and described except as defined by the appended claims.

Having thus described the invention what is claimed as new is:

1. The combination of a nut and a bolt having coöperating grooves adapted to form a keyway, the groove in the nut extending only part way therethrough and being deeper at its inner end, and a key fitting in the keyway, the end wall of the groove in the nut blocking the keyway so that said key will have a part thereof bent into said deeper part and a part bent into engagement with said bolt when the key is forced into the keyway.

2. The combination of a nut and a bolt having coöperating grooves adapted to form a keyway, a key fitting the keyway, and means whereby the key on insertion into the keyway is locked therein and bent upon itself to produce a thickened portion at the end of the key to wedge the parts together.

3. The combination of a nut and a bolt having coöperating grooves adapted to form a keyway, the groove in the nut varying in depth and passing only part way therethrough leaving a portion of the nut extending across the keyway, a key fitting the keyway and weakened intermediate its ends so that when it is driven into the keyway and engages the said portion of the nut extending across the keyway it will bend and part of the key will be forced into the deeper part of the groove in the nut and the end of the key will be forced into engagement with the bottom of the groove in the bolt to lock the nut and bolt together.

4. The combination of a nut and a bolt having coöperating grooves adapted to form a keyway, the groove in the nut passing only part way through the opening in the nut and being deeper at its inner end forming a cavity therein, a key fitting the keyway and weakened intermediate its ends, a thread of the nut extending across and blocking the keyway at the inner end thereof, said key having a part which limits its inward movement when the key is forced into the keyway and bends at its weakened portion sufficiently to fill the cavity and lock the key in the keyway.

5. The combination of an internally threaded nut and a threaded bolt having grooves adapted to coöperate to form a keyway, the groove in the nut being deeper and forming a locking cavity at its inner end, and extending only part way through the nut leaving threads extending across the keyway, a key fitting the keyway and having a weakened section near one end, said key when forced into said keyway being adapted to engage said threads and bent at the weakened section so as to curl the end and force a part of the key into said cavity and the end of the key into engagement with the bottom of said groove in the bolt.

6. The combination of a nut and a bolt having coöperating grooves adapted to form a keyway, the groove in the nut having a cavity joined thereto by a rounded shoulder, a key fitting the keyway and having a weakened section intermediate its ends, a thread of the nut extending across the keyway and adapted to deflect the end of the said key and bend a part thereof upwardly to fill the cavity and a part against the bottom of the groove in the bolt whereby any looseness of fit or slack in the threads on the opposite side of the nut and bolt is removed to securely key the nut and bolt together, means limiting the inward movement of the key and means whereby the key may be withdrawn, said rounded shoulder being adapted to restore the key to its original form as it is withdrawn from the keyway.

In testimony whereof I affix my signature in presence of two witnesses.

ERNEST R. AMES.

Witnesses:
GERTRUDE M. STUCKER,
E. L. GREENEWALD.